United States Patent
Pearson et al.

(10) Patent No.: US 7,616,950 B2
(45) Date of Patent: Nov. 10, 2009

(54) CALL FORWARDING CONTROL DEVICE AND METHOD OF CALL MANAGEMENT

(75) Inventors: Larry B. Pearson, San Antonio, TX (US); J. Bradley Bridges, San Antonio, TX (US)

(73) Assignee: AT&T Intellectual Property I, L.P., Reno, NV (US)

( * ) Notice: Subject to any disclaimer, the term of this patent is extended or adjusted under 35 U.S.C. 154(b) by 126 days.

(21) Appl. No.: 10/655,606

(22) Filed: Sep. 4, 2003

(65) Prior Publication Data

US 2005/0054335 A1    Mar. 10, 2005

(51) Int. Cl.
*H04M 3/42*    (2006.01)

(52) U.S. Cl. .................... 455/417; 455/344; 455/414.1; 455/426; 379/110.01

(58) Field of Classification Search .................. 455/461, 455/413, 417, 412, 74.1, 414.1, 70, 462, 455/426, 426.1, 422; 340/825.49, 7.29; 379/32, 388, 110.01, 71; 320/103
See application file for complete search history.

(56) References Cited

U.S. PATENT DOCUMENTS

| | | | |
|---|---|---|---|
| 4,275,385 A | | 6/1981 | White |
| 4,752,951 A | | 6/1988 | Konneker |
| 4,768,224 A | | 8/1988 | Waldman |
| 4,932,050 A | | 6/1990 | Davidson et al. |
| 5,229,701 A | | 7/1993 | Leman et al. |
| 5,353,331 A | | 10/1994 | Emery et al. |
| 5,375,161 A | * | 12/1994 | Fuller et al. .................. 455/417 |
| 5,469,496 A | | 11/1995 | Emery et al. |
| 5,603,054 A | | 2/1997 | Theimer et al. |
| 5,712,911 A | * | 1/1998 | Her ........................ 379/388.01 |
| 5,745,850 A | * | 4/1998 | Aldermeshian et al. ..... 455/417 |
| 5,751,789 A | * | 5/1998 | Farris et al. ............... 379/32.04 |
| 5,842,112 A | * | 11/1998 | Fuller et al. ............ 340/825.49 |
| 5,920,815 A | | 7/1999 | Akhavan |
| 5,995,839 A | | 11/1999 | Coursey et al. |
| 6,041,229 A | | 3/2000 | Turner |

(Continued)

FOREIGN PATENT DOCUMENTS

EP    0700227 A2    3/1996

(Continued)

OTHER PUBLICATIONS

Webopedia; "Short Message Service"; www.webopedia.com/TERM/S/Short_Message_Service.html; 3 pages, Jul. 8, 2003.

(Continued)

*Primary Examiner*—Charles N Appiah
*Assistant Examiner*—Michael T Vu
(74) *Attorney, Agent, or Firm*—Toler Law Group

(57) ABSTRACT

In a particular embodiment, the disclosure is directed to a device that includes a proximity sensor, a network interface, and a module. The proximity sensor determines the proximity of a mobile device. The module is coupled to the network interface and is coupled to the proximity sensor. The module is configured to receive a signal from the proximity sensor indicating whether the mobile device is in proximity to the proximity sensor. The module is configured to transmit a call forwarding control signal via the network interface. The call forwarding control signal is associated with a landline phone number.

10 Claims, 2 Drawing Sheets

U.S. PATENT DOCUMENTS

| | | | |
|---|---|---|---|
| 6,073,031 | A | 6/2000 | Helstab et al. |
| 6,091,948 | A | 7/2000 | Carr et al. |
| 6,091,949 | A | 7/2000 | Sanchez |
| 6,130,938 | A | 10/2000 | Erb |
| 6,185,427 | B1 | 2/2001 | Krasner et al. |
| 6,188,888 | B1 | 2/2001 | Bartle et al. |
| 6,201,950 | B1 * | 3/2001 | Fuller et al. ............... 340/7.29 |
| 6,208,854 | B1 * | 3/2001 | Roberts et al. ............. 455/417 |
| 6,231,371 | B1 | 5/2001 | Helot |
| 6,233,450 | B1 * | 5/2001 | Seppanen ................ 455/426.1 |
| 6,240,297 | B1 | 5/2001 | Jadoul |
| 6,253,231 | B1 | 6/2001 | Fujii |
| 6,301,350 | B1 | 10/2001 | Henningson et al. |
| 6,320,534 | B1 | 11/2001 | Goss |
| 6,332,082 | B1 * | 12/2001 | Fuller et al. ................. 455/461 |
| 6,362,778 | B2 | 3/2002 | Neher |
| 6,373,817 | B1 | 4/2002 | Kung et al. |
| 6,381,453 | B1 | 4/2002 | Krishnan |
| 6,389,117 | B1 | 5/2002 | Gross et al. |
| 6,424,840 | B1 | 7/2002 | Fitch et al. |
| 6,480,593 | B1 | 11/2002 | Munday et al. |
| 6,505,055 | B1 | 1/2003 | Kahn et al. |
| 6,516,060 | B1 | 2/2003 | Foladare et al. |
| 6,574,213 | B1 | 6/2003 | Anandakumar et al. |
| 6,574,470 | B1 | 6/2003 | Chow et al. |
| 6,587,475 | B1 | 7/2003 | Przygienda |
| 6,600,734 | B1 | 7/2003 | Gernert et al. |
| 6,609,006 | B1 | 8/2003 | Mori |
| 6,611,681 | B2 * | 8/2003 | Henderson ................. 455/413 |
| 6,614,206 | B1 | 9/2003 | Wong et al. |
| 6,614,784 | B1 | 9/2003 | Glitho et al. |
| 6,625,423 | B1 * | 9/2003 | Wang ......................... 455/74.1 |
| 6,650,088 | B1 | 11/2003 | Webb et al. |
| 6,704,580 | B1 | 3/2004 | Fintel |
| 6,708,028 | B1 | 3/2004 | Byrne |
| 6,735,432 | B1 | 5/2004 | Jarett et al. |
| 6,763,250 | B1 | 7/2004 | Forbes, Jr. |
| 6,766,175 | B2 | 7/2004 | Uchiyama |
| 6,798,647 | B2 | 9/2004 | Dickie |
| 6,892,083 | B2 | 5/2005 | Shostak |
| 7,376,112 | B2 | 5/2005 | Liu |
| 6,931,249 | B2 | 8/2005 | Fors et al. |
| 6,950,675 | B2 | 9/2005 | Wilhelm |
| 6,975,713 | B1 | 12/2005 | Smith et al. |
| 6,978,154 | B1 | 12/2005 | Ospalak et al. |
| 6,978,163 | B2 | 12/2005 | Dyer et al. |
| 6,987,988 | B2 | 1/2006 | Uchiyama |
| 6,993,363 | B1 | 1/2006 | Hsu |
| 7,006,833 | B1 | 2/2006 | Contractor |
| 7,068,669 | B2 | 6/2006 | Abrol et al. |
| 7,171,199 | B1 | 1/2007 | Rahman |
| 2001/0014599 | A1 * | 8/2001 | Henderson ................. 455/412 |
| 2001/0019955 | A1 * | 9/2001 | Henderson ................. 455/426 |
| 2001/0024953 | A1 | 9/2001 | Balogh |
| 2002/0000930 | A1 | 1/2002 | Crowson et al. |
| 2002/0029258 | A1 | 3/2002 | Mousseau et al. |
| 2002/0113879 | A1 | 8/2002 | Battle et al. |
| 2002/0115480 | A1 | 8/2002 | Huang |
| 2002/0119800 | A1 | 8/2002 | Jaggers et al. |
| 2002/0137472 | A1 | 9/2002 | Quinn et al. |
| 2002/0165988 | A1 | 11/2002 | Khan et al. |
| 2002/0172336 | A1 * | 11/2002 | Postma et al. .......... 379/110.01 |
| 2002/0181442 | A1 | 12/2002 | Rajani |
| 2003/0003900 | A1 * | 1/2003 | Goss et al. ................. 455/417 |
| 2003/0011682 | A1 | 1/2003 | Sellen et al. |
| 2003/0040308 | A1 * | 2/2003 | Gieseke ...................... 455/426 |
| 2003/0050051 | A1 | 3/2003 | Vilander |
| 2003/0073411 | A1 * | 4/2003 | Meade, II .................... 455/70 |
| 2003/0092451 | A1 | 5/2003 | Holloway et al. |
| 2003/0125075 | A1 | 7/2003 | Klovborg |
| 2003/0133421 | A1 | 7/2003 | Sundar et al. |
| 2003/0134630 | A1 * | 7/2003 | Scheinert et al. ............ 455/422 |
| 2003/0181202 | A1 | 9/2003 | Link, III et al. |
| 2003/0217180 | A1 | 11/2003 | Chandra et al. |
| 2004/0018774 | A1 | 1/2004 | Long et al. |
| 2004/0032484 | A1 | 2/2004 | Halttunen |
| 2004/0051497 | A1 * | 3/2004 | Richards et al. ............. 320/103 |
| 2004/0066776 | A1 | 4/2004 | Ishidoshiro |
| 2004/0120492 | A1 * | 6/2004 | Lew et al. ............. 379/207.02 |
| 2004/0127241 | A1 | 7/2004 | Shostak |
| 2004/0156491 | A1 | 8/2004 | Reding et al. |
| 2004/0203374 | A1 | 10/2004 | Zilliacus |
| 2004/0203648 | A1 * | 10/2004 | Wong ....................... 455/414.1 |
| 2004/0204056 | A1 | 10/2004 | Phelps, III |
| 2004/0208297 | A1 | 10/2004 | Valentine |
| 2004/0213212 | A1 | 10/2004 | Reding et al. |
| 2004/0218575 | A1 | 11/2004 | Ibe et al. |
| 2004/0219948 | A1 | 11/2004 | Jones et al. |
| 2004/0259544 | A1 | 12/2004 | Amos |
| 2005/0091250 | A1 | 4/2005 | Dunn et al. |
| 2005/0091290 | A1 | 4/2005 | Cameron et al. |
| 2005/0096024 | A1 | 5/2005 | Bicker et al. |
| 2005/0201362 | A1 | 9/2005 | Klein et al. |
| 2005/0210101 | A1 | 9/2005 | Janik |
| 2005/0215243 | A1 | 9/2005 | Black et al. |
| 2005/0273781 | A1 | 12/2005 | Nakamura et al. |
| 2005/0277431 | A1 | 12/2005 | White |
| 2005/0282582 | A1 | 12/2005 | Slotznick |
| 2006/0003806 | A1 | 1/2006 | Weber et al. |
| 2006/0031587 | A1 | 2/2006 | Paterson et al. |
| 2006/0136546 | A1 | 6/2006 | Trioano et al. |
| 2007/0042789 | A1 | 2/2007 | Moton et al. |

FOREIGN PATENT DOCUMENTS

| | | | |
|---|---|---|---|
| EP | | 1107549 A2 | 6/2001 |
| EP | | 1445936 A2 | 8/2004 |

OTHER PUBLICATIONS

"Cellular Phone and Roaming Service"; www.members.tripod.com/peacecraft/infomining/cellphon.htm; 19 pages, Jul. 8, 2003.

Verb Exchange Service—Tagline—One number gets me everywhere; www.verbx.com/srv/service_tagline.html; 1 page, May 16, 2003.

Zbar, Jeff "Follow-me phone service keeps remote worker tethered to clients, co-workers"; NetworkWorldFusion; www.nwfusion.com/net.worker/columnists/2002/0826zbar.html; 3 pages, May 16, 2003.

www.officescape.com/services.asp; Follow-me phone; 1 page, May 16, 2003.

Callagenix "call diversion service", www.callagenix.com/services/diversion.html; 3 pages, May 16, 2003.

Gupta, Puneet, "Short Message Service: What, How and Where?"; Wireless Developer Network; www.wirelessdevnet.com/channels/sms/features/sms.html; 7 pages, Jul. 8, 2003.

Charney, Ben; "VoIP Maker Plans Cell Hybrid"; http://zdnet.com, News Software; Oct. 3, 2003. pp. 1-3.

International Search Report and Written Opinion of the International Searching Authority for PCT/US04/34239; Feb. 17, 2005; 10 pages.

International Search Report and Written Opinion of the International Searching Authority for PCT/US05/16449; Apr. 10, 2006, 11 pages.

International Search Report and Written Opinion of the International Searching Authority for PCT/US04/16017; Aug. 16, 2005; 7 pages.

International Search Report and Written Opinion of the International Searching Authority for PCT/US04/28260; Sep. 30, 2005; 10 pages.

International Search Report and Written Opinion of the International Searching Authority for PCT/US2005/016449; Jun. 15, 2006; 3 pages.

Waters, James, Introduction Neon Tech's SurfReady Set-Top Box, printed from http://www.net4tv.com/VOICE/Story.cfm?storyID=3199, Jan. 7, 2001 12 pages.

* cited by examiner

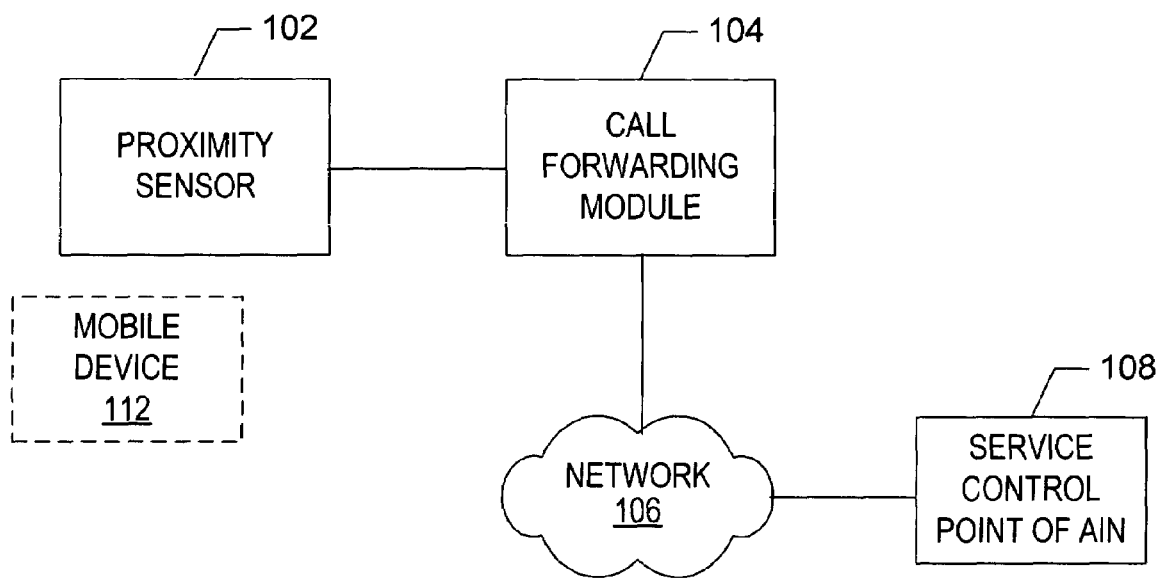
*FIG. 1*
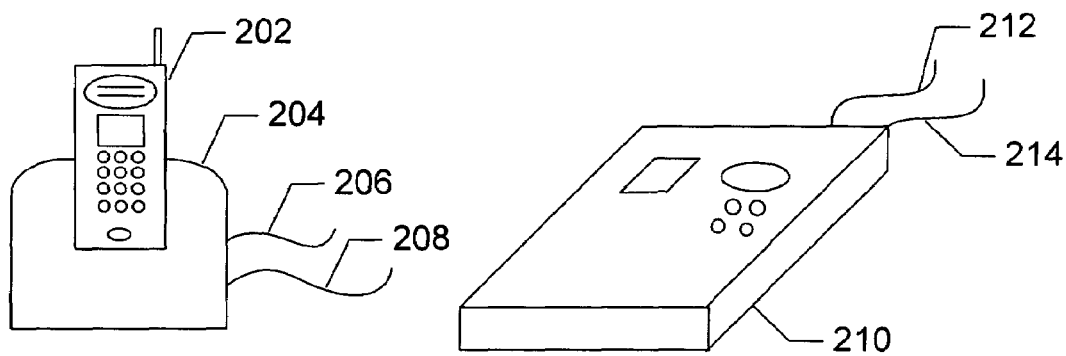
*FIG. 2A*   *FIG. 2B*

CALL FORWARDING CONTROL DEVICE AND METHOD OF CALL MANAGEMENT

TECHNICAL FIELD OF DISCLOSURE

This disclosure, in general, relates to a call forwarding control device and methods for call management.

BACKGROUND

In an increasingly mobile society, mobile telephones and telecommunications devices have become ubiquitous. Cell phones and other mobile telecommunications devices offer the ability to be in contact or reachable at all times. However, users of cell phones typically have more than one phone number at which they may be reached. For example, cellular telephone users may also have a landline phone number for their home or office.

In a typical situation, a caller may attempt one of several numbers in an attempt to reach an individual. For example, a caller may call a home number then a cell number or office number. This added effort wastes time and telephony resources.

To save time many callers will call a cell phone or mobile telecommunications device number first. But, receiving a call on a cell phone is more expensive than receiving a phone call on the user's landline phone.

Some service providers have implemented a service in which different numbers provided by the user are attempted until the user answers. However, callers may become frustrated while waiting through several attempts to connect to the user through different numbers. As such, an improved method for managing phone calls would be desirable.

BRIEF DESCRIPTION OF FIGURES

FIG. 1 depicts an exemplary embodiment of a call management system.

FIGS. 2A, 2B, and 3 depict exemplary embodiments of call management devices.

DETAILED DESCRIPTION OF THE DRAWINGS

Figure 3:
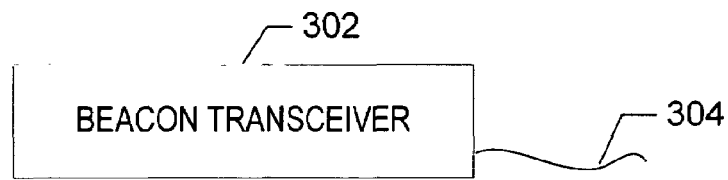

FIG. 1 depicts an exemplary system for call management. The system depicts an exemplary customer premise equipment system that provides automated call forwarding. When a user is at home or at the office, calls should be received at the user's landline telephone. However, when away from the landline telephone, the user may receive calls using their mobile phone or cellular phone. Generally, when a user is proximate to one network address, calls or data are routed to that network address and when the user is not proximate to the network address, calls or data are routed to an alternate address.

In one particular embodiment, a customer premise device associated with the landline location detects the presence of the user by detecting the presence of a mobile device associated with the user. When the user is proximate to the landline location, calls and data addressed to the landline address are received at the landline. However, when the user is not proximate to the landline location, calls and data addressed to the landline are forwarded or redirected to an alternate address, such as a mobile telephone. For example, the device may send flash-hook forward commands to forward an incoming call or #-commands to manipulate call redirection parameters at the service control point or service switch point.

In FIG. 1, the system includes a proximity sensor 102 and a call forwarding module 104. The proximity sensor 102 is coupled to or communicates with the call forwarding module 104. The proximity sensor 102 detects whether a mobile device 112 is proximate to the proximity sensor 102. The proximity sensor 102 communicates this result to the call forwarding module 104. The call forwarding module uses this information to determine whether to activate or deactivate call forwarding. For example the call forwarding module 104 may communicate through a network 106 to a server or database 108 that controls call forwarding.

In one exemplary embodiment, the proximity sensor 102 and call forwarding module 104 are built into a landline communications device, such as a landline telephone system or answering machine. In alternate embodiments, the proximity sensor 102 and call forwarding module 104 may be built into a cell phone charger or stand-alone device. In each of these exemplary embodiments, the call forwarding module 104 is connected to a network 106, such as a public switch telephone network (PSTN). The call forwarding module 104 may activate or deactivate call forwarding using a flash command or pound sign command, for example, as permitted by the functionality of the network and associated server systems 108. An exemplary server system 108 is a service control point (SCP) in an advanced intelligent network (AIN) as commonly used in telephony infrastructure.

In these exemplary embodiments, when the mobile device 112 is proximate to the proximity sensor 102, the call forwarding module 104 may deactivate call forwarding and receive calls at a landline phone. Alternately, when the mobile device 112 is not proximate to the proximity sensor 102, the call forwarding module 014 may activate call forwarding on an associated landline to an alternate number.

The mobile device 112 may be a cellular telephone, mobile phone or other mobile telecommunications device. Alternately, the mobile device 112 may be a keychain fob, smart card, or other device that would indicate the presence of an individual.

The proximity sensor 102 may determine the presence of the mobile device 112, by use of radio frequency transmissions, infrared or other light based transmissions, or ultrasonic transmissions. For example, the proximity sensor may utilize short range networking standards such as Bluetooth® or 802.11. In alternate embodiments, the proximity sensor may communicate with the mobile device 112 using short message service messages. The proximity sensor 102 may alternately listen to control channels of mobile telecommunications systems. In another alternate embodiment, the proximity sensor may detect a radio frequency beacon. In other embodiments, the proximity sensor may use a contact sensor, infrared detection system, or sonic detection system.

FIGS. 2A, 2B, and 3 depict exemplary embodiments of call management devices. FIG. 2A depicts an exemplary mobile telecommunications device charger. A mobile telecommunications device such as a cell phone or mobile telephone 202 may be placed in a charger 204. The charger may be connected to an electric outlet through a power line 206. In addition, the charger may be connected to a public switch telephone network through a telephone line 208. When the mobile telecommunications device 202 is in contact with the charger 204, the call forwarding module may selectively send a call forwarding deactivation signal to the public switch telephone network to direct incoming calls to an associated landline at that landline address. When the mobile telecommunications device is removed from the charger 204, the charger 204 may selectively activate call forwarding by sending a call forwarding message to the public switch telephone network, effectively forwarding calls directed to an associated landline address to an alternate address such as the mobile telecommunications device 202. A call forwarding module within the charger 204 may be provided with the call forwarding number through communication with the cell phone 202. In alternate embodiments, the charger 204 may be provided with a user interface or may utilize the number entry interface of other telephones connected to or associated with the landline address. Such a user interface allows a user to enter a phone number for use by the call forwarding module.

In another exemplary embodiment, FIG. 2B depicts answering machine 210. The answering machine 210 may include a proximity sensor and a call forwarding module. The answering machine may be connected to a power supply through transmission line 212 and a landline phone network through telephone line 214. The answering machine 210 may, for example, detect the proximity of a mobile device through a radio frequency communication method. The answering machine 210 may then selectively activate or deactivate call forwarding of calls to the landline address of the line 214 based on detection of a mobile device within a specified proximity of the answering machine 210.

FIG. 3 depicts an alternate embodiment of a beacon transceiver device 302 connected to a landline telecommunications system, through line 304. The beacon device may be a low power radio frequency or infrared device that utilizes power from the telecommunications system. The device 302 may detect proximity to a mobile device, such as a cell phone or key fob, through a radio frequency communication. Alternately, the device 302 may listen to control signals communicated between a mobile device and a remote mobile telecommunications network. The device 302 may selectively communicate with the public switch telephone network to activate or deactivate call forwarding of calls addressed to the landline address of line 304 based on detection of a proximate mobile device.

Figure 4:
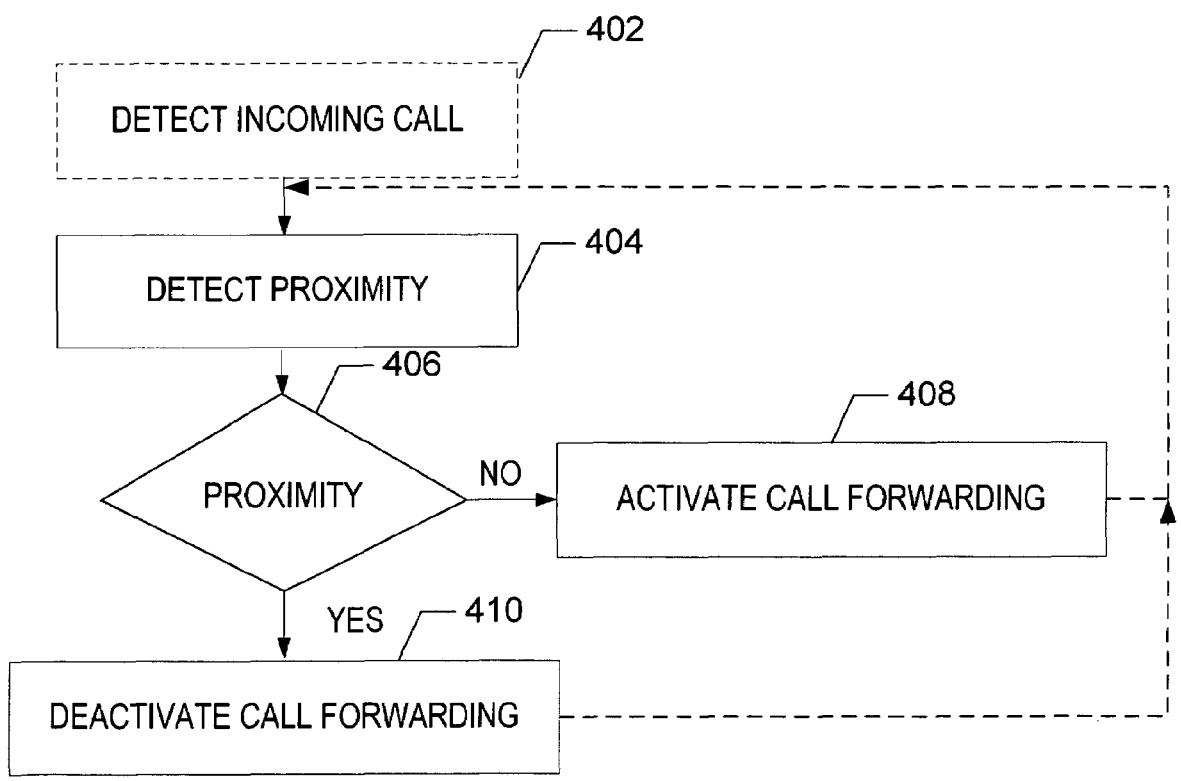
FIG. 4 illustrates an exemplary method for call management.

FIG. 4 depicts an exemplary method for managing call forwarding. The method may be activated upon receipt of an incoming call to a landline address. Alternately, the method may be activated periodically. For example, a system may detect an incoming call directed to a landline address, as shown at step 402. The system may detect a proximity to the mobile device, as shown at step 404. Based on the proximity of the mobile device, as shown at step 406, call forwarding of the landline telephone may be deactivated. For example, when the mobile device is proximate to the proximity sensor, as shown in step 410, a call forwarding deactivation message may be transmitted. Alternately, call forwarding may be activated for the landline address, as shown at step 408. The call forwarding activation or deactivation may utilize a flash-hook command or a pound (#) command. For example, in some geographic telephone regions, 72# or 73# input, may activate or deactivate call forwarding.

In a particular embodiment, the disclosure is directed to a device that includes a proximity sensor, a network interface, and a module. The proximity sensor determines the proximity of a mobile device. The module is coupled to the network interface and is coupled to the proximity sensor. The module is configured to receive a signal from the proximity sensor indicating whether the mobile device is in proximity to the proximity sensor. The module is configured to transmit a call forwarding control signal via the network interface. The call forwarding control signal is associated with a landline phone number.

In a particular embodiment, the signal from the proximity sensor may indicate whether the mobile device is in proximity to the proximity sensor. The proximity sensor may be incorporated into a mobile device recharging device, an answering machine and/or a telephone. In an illustrative embodiment, the proximity sensor may detect the mobile device wirelessly.

In a particular embodiment, the network interface may include a landline telecommunications network interface. The landline telecommunications network interface may be coupled to a public switched telephone network. The landline telecommunications network interface may be coupled to a short message service compatible network. In an illustrative embodiment, the landline telecommunications network interface may be coupled to an Internet. The call forwarding control signal may include an internet protocol compatible data packet.

In a particular embodiment, the call forwarding control signal may include a flash hook call transfer. The call forwarding control signal may be a short message service compatible message. In an illustrative embodiment, the call forwarding control signal may include a call forwarding activation signal. For example, the call forwarding control signal may include a call forwarding activation when the mobile phone is determined to not be proximate to the proximity sensor. The can forwarding control signal may include a call forwarding deactivation signal. For example, the call forwarding control signal may include a call forwarding deactivation when the mobile phone is determined to be proximate to the proximity sensor.

The device may further include a user interface coupled to the module. The module may be configured to receive a forwarding telephone number from the user interface.

In another embodiment, the disclosure is directed to a call forwarding control device. The call forwarding control device includes a proximity sensor, a public switch telephone network interface, and a module. The proximity sensor determines whether a mobile phone is proximate to the proximity sensor. The module is coupled to the public switch telephone network interface. The module is coupled to the proximity sensor. The module is configured to communicate with the proximity sensor to determine whether the mobile phone is proximate to the proximity sensor. The module is configured to transmit a call forwarding control signal via the public switch telephone network interface.

In a further embodiment, the disclosure is directed to a method of call management. The method includes determining whether a mobile device is proximate to the proximity sensor, and sending a call control signal using a control module via a network interface. The call control signal comprises or includes a call forwarding activation if the mobile device is not proximate to the proximity sensor. The call control signal includes a call forwarding de-activation signal if the mobile device is proximate to the proximity sensor.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A call forwarding control device comprising:
a proximity sensor to determine whether a mobile phone is proximate to the proximity sensor;

a mobile phone recharging device to recharge the mobile phone, the mobile phone recharging device including a call forwarding module to receive a call forwarding number from the mobile phone, the call forwarding module coupled to the proximity sensor; and a network interface to transmit a call forwarding control signal via a network when the proximity sensor determines that the mobile phone is not proximate to the proximity sensor, wherein the call forwarding control signal activates forwarding of calls directed to a landline phone to the call forwarding number received from the mobile phone, wherein the network interface is further to transmit a deactivate call forwarding control signal via the network when the proximity sensor determines that the mobile phone is proximate to the proximity sensor.

2. The call forwarding control device of claim 1, wherein the call forwarding control signal comprises a short messaging service message.

3. The call forwarding control device of claim 1, wherein the call forwarding control signal comprises an internet protocol message.

4. The call forwarding control device of claim 1, wherein the proximity sensor is to determine that the mobile phone is proximate to the proximity sensor when the mobile phone is in contact with the mobile phone recharging device.

5. The call forwarding control device of claim 1, wherein the proximity sensor is to determine that the mobile phone is not proximate to the proximity sensor when the mobile phone is not in contact with the mobile phone recharging device.

6. The call forwarding control device of claim 1, wherein the call forwarding module is to receive the call forwarding number from the mobile phone while the mobile phone is in contact with the mobile phone recharging device.

7. The call forwarding control device of claim 1, wherein the network includes an Internet.

8. The call forwarding control device of claim 1, wherein the proximity sensor is to determine a proximity of the mobile device to the proximity sensor by use of radio frequency transmissions.

9. The call forwarding control device, of claim 1, wherein the proximity sensor is to determine a proximity of the mobile device to the proximity sensor by use of light based transmissions.

10. The call forwarding control device of claim 1, wherein the proximity sensor is to determine a proximity of the mobile device to the proximity sensor by use of ultrasonic transmissions.

* * * * *